US012576668B2

(12) United States Patent
Jang

(10) Patent No.: US 12,576,668 B2
(45) Date of Patent: Mar. 17, 2026

(54) NIPPLE ASSEMBLY FOR SPOKE WHEEL, AND SPOKE WHEEL INCLUDING SAME

(71) Applicant: Diamante Cycle Co., Ltd., Pohang-si (KR)

(72) Inventor: Hyuk Ju Jang, Pohang-si (KR)

(73) Assignee: DIAMANTE CYCLE CO., LTD., Pohang-si (KR)

( * ) Notice: Subject to any disclaimer, the term of this patent is extended or adjusted under 35 U.S.C. 154(b) by 286 days.

(21) Appl. No.: 18/284,134

(22) PCT Filed: Apr. 2, 2021

(86) PCT No.: PCT/KR2021/004134
§ 371 (c)(1),
(2) Date: Sep. 26, 2023

(87) PCT Pub. No.: WO2022/211160
PCT Pub. Date: Oct. 6, 2022

(65) Prior Publication Data
US 2024/0149609 A1     May 9, 2024

(30) Foreign Application Priority Data
Mar. 29, 2021     (KR) ........................ 10-2021-0040729

(51) Int. Cl.
*B60B 1/04*          (2006.01)
*B60B 1/00*          (2006.01)

(52) U.S. Cl.
CPC .............. *B60B 1/045* (2013.01); *B60B 1/003* (2013.01); *B60B 1/042* (2013.01); *B60B 1/043* (2013.01); *B60B 2900/131* (2013.01)

(58) Field of Classification Search
CPC ......... B60B 1/041; B60B 1/042; B60B 1/044; B60B 1/045; B60B 1/046; B60B 1/047; B60B 2900/131; B60B 1/043; B60B 1/003
See application file for complete search history.

(56) References Cited

U.S. PATENT DOCUMENTS 4,626,036 A * 12/1986 Hinsberg .............. B60B 21/104
                                                                       301/58
5,806,935 A      9/1998 Shermeister
(Continued)

FOREIGN PATENT DOCUMENTS

DE          583902 C  *  9/1933
DE     102009052027       5/2011
(Continued)

OTHER PUBLICATIONS

EPO, Search Report of EP 21935274.7 dated Feb. 24, 2025, total 9 pages.

*Primary Examiner* — Kip T Kotter
(74) *Attorney, Agent, or Firm* — LEX IP MEISTER, PLLC

(57) ABSTRACT

A nipple assembly for a spoke wheel according to the present disclosure is coupled to at least one end of a spoke provided on a spoke wheel and includes a main body including a nipple head, and a column portion having a smaller diameter than the nipple head and elongated from the nipple head toward one side, a nipple base having a first through-hole and fitted with the column portion through the first through-hole, and a vibration attenuation member having a second through-hole and positioned between the nipple head and the nipple base by being fitted with the column portion through the second through-hole.

15 Claims, 9 Drawing Sheets

(56) References Cited

U.S. PATENT DOCUMENTS

| | | | | |
|---|---|---|---|---|
| 6,938,962 | B1 * | 9/2005 | Schlanger | ............. B60B 21/062 |
| | | | | 301/58 |
| 2004/0165938 | A1 * | 8/2004 | Chen | ....................... B60B 1/047 |
| | | | | 403/43 |
| 2007/0029869 | A1 | 2/2007 | Senoo | |
| 2008/0290721 | A1 | 11/2008 | Wang | |
| 2019/0168536 | A1 * | 6/2019 | Meggiolan | .............. B60B 1/044 |
| 2021/0162801 | A1 * | 6/2021 | Meggiolan | .............. B60B 1/044 |
| 2022/0032680 | A1 * | 2/2022 | Meggiolan | ............ B60B 21/062 |

FOREIGN PATENT DOCUMENTS

| | | | | |
|---|---|---|---|---|
| DE | 102011120407 A1 * | 6/2013 | ........... B60B 21/062 |
| EP | 2094509 | 8/2010 | |
| EP | 2272684 | 1/2011 | |
| EP | 2403721 | 7/2013 | |
| GB | 2479958 A * | 11/2011 | ............. B60B 21/06 |
| JP | 2002-234301 | 8/2002 | |
| JP | 2005-212773 | 8/2005 | |
| WO | 2020-115693 | 6/2020 | |

* cited by examiner

NIPPLE ASSEMBLY FOR SPOKE WHEEL, AND SPOKE WHEEL INCLUDING SAME

TECHNICAL FIELD

The present disclosure relates to a nipple assembly for a spoke wheel and a spoke wheel including the same.

BACKGROUND ART

Among the criteria for evaluating high-performance bicycle wheels, reactivity and comfort are considered very important factors. However, the reactivity and comfort are different and incompatible. The reactivity (or acceleration performance) is a criterion for evaluating how immediately the bicycle wheel responds to the acceleration, and the comfort is a criterion for evaluating how much less a human body is fatigued when a bicycle travels a long distance.

The reactivity of the wheel increases as stiffness of the wheel increases on the assumption that an external shape design of the wheel, a used material, a weight (point mass), and a moment of inertia remain the same. However, when the stiffness of the wheel increases, the ability of the wheel to absorb road surface impact, and the comfort relatively decreases.

Likewise, when the stiffness of the wheel decreases to improve the ability of the wheel to absorb the road surface impact (a displacement capable of corresponding to the amount of impact), torque, which is transmitted from a bicycle pedal when the bicycle accelerates, is consumed as wheel deformation energy to that extent without being purely transmitted in a wheel rotation direction, which eventually degrades the reactivity of the bicycle on which the wheel is mounted.

In practice, most bicycle wheel manufacturers have introduced prototypes that appropriately compromise the reactivity (stiffness) and the comfort, which are opposite to each other, by selecting a material. For example, an example of the wheel, to which a high-priced, high-stiffness (high-modulus) carbon fiber material is applied, is light in weight and has excellent reactivity, but this wheel degrades the comfort because fatigue is accumulated on the human body as the bicycle travels a long distance. Another example of the wheel, which uses a low-cost material with relatively small stiffness, is heavy in weight and has low reactivity, but this wheel may improve the comfort because fatigue is less accumulated when the bicycle travels a long distance. Still another example of the wheel may have intermediate characteristics between the two wheels and thus have performance with overall excellent reactivity and comfort even though this type of wheel does not exhibit excellent reactivity nor comfort. Accordingly, in order to improve the performance of a high-performance bicycle wheel, there is a need for a method of improving comfort without decreasing the reactivity (stiffness) of the wheel.

DISCLOSURE

Technical Problem

The present disclosure has been made in an effort to provide a nipple assembly for a spoke wheel, which is capable of improving reactivity and comfort.

The present disclosure has also been made in an effort to provide a spoke wheel including the nipple assembly.

However, the object to be achieved by the embodiments of the present disclosure is not limited to the above-mentioned object but may be variously expanded without departing from the technical spirit of the present disclosure.

Technical Solution

An exemplary embodiment of the present disclosure provides a nipple assembly for a spoke wheel, which is coupled to at least one end of a spoke provided on a spoke wheel, the nipple assembly including: a main body including a nipple head, and a column portion having a smaller diameter than the nipple head and elongated from the nipple head toward one side; a nipple base having a first through-hole and fitted with the column portion through the first through-hole; and a vibration attenuation member having a second through-hole and positioned between the nipple head and the nipple base by being fitted with the column portion through the second through-hole.

The nipple base may have a tapered surface formed to be tapered in an extension direction of the column portion.

A diameter of the vibration attenuation member may be equal to a maximum diameter of the nipple head or a maximum diameter of the nipple base.

The nipple base and the main body may be made of metal, and the vibration attenuation member may be made of polymer.

The nipple base and the main body may be made of at least one selected from a group consisting of steel, stainless steel, aluminum, brass, titanium, and alloys thereof, and the vibration attenuation member may be made of polyetheretherketone (PEEK) or polyamide-imide (PAI).

The nipple assembly for a spoke wheel according to the exemplary embodiment of the present disclosure may further include a thin adhesive film or bonding agent provided between the nipple base and one surface of the vibration attenuation member and between the main body and the other surface of the vibration attenuation member and configured to attach the nipple base and the vibration attenuation member and attach the main body and the vibration attenuation member.

Tolerance may be set between the column portion of the main body and the second through-hole of the vibration attenuation member and between the column portion of the main body and the first through-hole of the nipple base.

The vibration attenuation member may have a protruding portion provided around the second through-hole and extending and protruding toward one side at least in an axial direction, and at least one of the nipple base and the nipple head may have a groove provided around the column portion and coupled to the protruding portion.

Another exemplary embodiment of the present disclosure provides a spoke wheel, in which a rim and a hub are connected by a plurality of spokes, the spoke wheel including: a nipple assembly coupled to at least one end of the spoke, in which the nipple assembly includes: a main body including a nipple head positioned at one side based on a penetration direction of a spoke hole provided in the rim or the hub, a column portion extending from the nipple head toward the other side and screw-coupled to the spoke while penetrating the spoke hole; a nipple base having a first through-hole, fitted with the column portion through the first through-hole, disposed at one side based on the penetration direction of the spoke hole, and supported on the rim or the hub; and a vibration attenuation member having a second through-hole and positioned between the nipple head and the nipple base by being fitted with the column portion through the second through-hole.

The nipple base may be formed to be tapered in an extension direction of the column portion.

The spoke hole may be provided in the rim, and the nipple base may be supported and seated on an edge of the spoke hole of the rim.

The spoke hole may be provided in the hub, and the nipple base may be supported and seated on an edge of the spoke hole of the hub.

The nipple base and the main body may be made of metal, and the vibration attenuation member may be made of polymer.

The nipple base and the main body may be made of at least one selected from a group consisting of steel, stainless steel, aluminum, brass, titanium, and alloys thereof, and the vibration attenuation member may be made of polyetheretherketone (PEEK) or polyamide-imide (PAI).

Tolerance may be set between the column portion of the main body and the second through-hole of the vibration attenuation member and between the column portion of the main body and the first through-hole of the nipple base.

Advantageous Effect

As described above, the nipple assembly for a spoke wheel according to the embodiment may have the nipple base, the vibration attenuation member, and the main body and be used to mount the spoke on the rim or the hub, thereby effectively attenuating fine vibration between the spoke and the rim or the hub. Therefore, the nipple assembly for a spoke wheel may improve the reactivity and comfort of the wheel by attenuating fine vibration.

MODE FOR INVENTION

Figure 1:
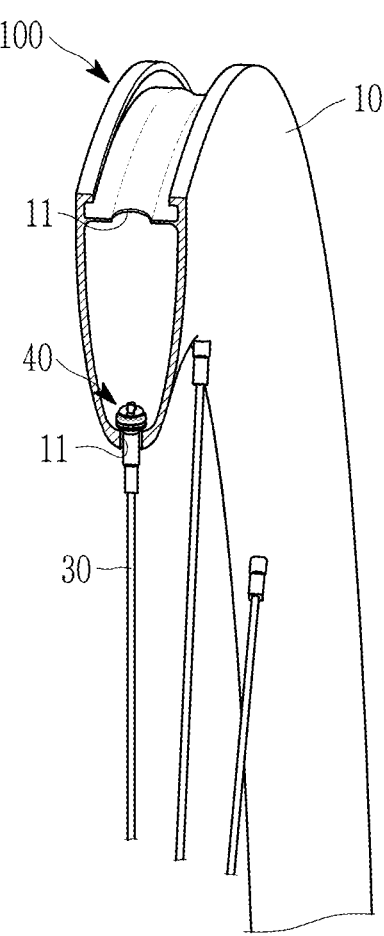
FIG. 1 is a partial perspective view illustrating a spoke wheel including a nipple assembly for a spoke wheel according to a first embodiment of the present disclosure.

Hereinafter, embodiments of the present disclosure will be described in detail with reference to the accompanying drawings so that those with ordinary skill in the art to which the present disclosure pertains may easily carry out the embodiments. However, the present disclosure may be implemented in various different ways and is not limited to the embodiments described herein. In the drawings, a part irrelevant to the description will be omitted to clearly describe the present disclosure, and the same or similar constituent elements will be designated by the same reference numerals throughout the specification.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Throughout the specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof. Therefore, unless explicitly described to the contrary, the word "comprise/include" and variations such as "comprises/includes" or "comprising/including" will be understood to imply the inclusion of stated elements, not the exclusion of any other elements.

FIG. 1 is a partial perspective view illustrating a spoke wheel including a nipple assembly for a spoke wheel according to a first embodiment of the present disclosure. With reference to FIG. 1, a spoke wheel 100 includes a rim 10, a hub 20 (see FIG. 8) disposed at a center of the rim 10, and a plurality of spokes 30 configured to radially connect the rim 10 and the hub 20. The spoke wheel 100 includes nipple assemblies 40 each coupled to at least one end of the spoke 30.

The nipple assembly 40 is coupled and installed in a spoke hole 11 provided in the rim 10 or a spoke hole 21 provided in the hub 20. The nipple assembly 40 may be configured to be screw-coupled to the spoke 30. For convenience of description, a description of the spoke hole 21 of the hub 20 will be omitted, and the spoke hole 11 of the rim 10 will be described.

In the spoke wheel 100, the plurality of spokes holes 11 is provided in the rim 10, and the nipple assemblies 40 are respectively coupled and installed in the spoke holes 11. That is, the nipple assembly 40 is penetratively disposed in the spoke hole 11 from the radial outside to the radial inside of the rim 10 and screw-coupled to one end of the spoke 30 provided from the radial inside to the radial outside.

The other end of the spoke 30 is coupled to the spoke hole provided in the hub (not illustrated). Therefore, the spoke 30 receives compressive strength, an impact load, and a tensile force between the rim 10 and the hub. That is, high compressive strength, impact resistance, and flame resistance are required for the spoke 30 and the nipple assembly 40. Because the spoke 30 is a rigid body having high compressive strength, the nipple assembly 40 is responsible for impact resistance and flame resistance.

Figure 2:
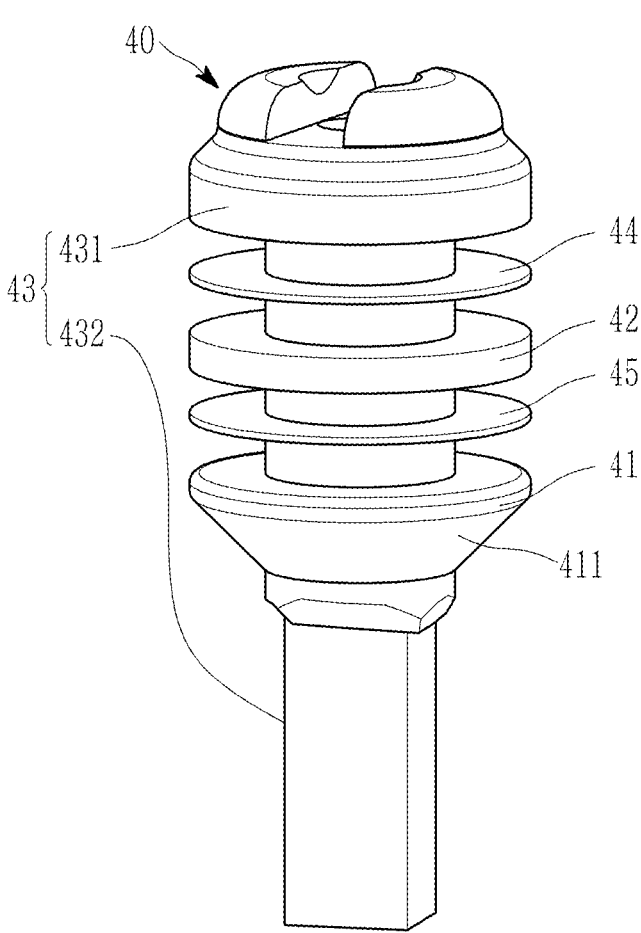
FIG. 2 is a perspective view illustrating a state in which the nipple assembly for a spoke wheel applied to FIG. 1 is loosely coupled.
Figure 3:
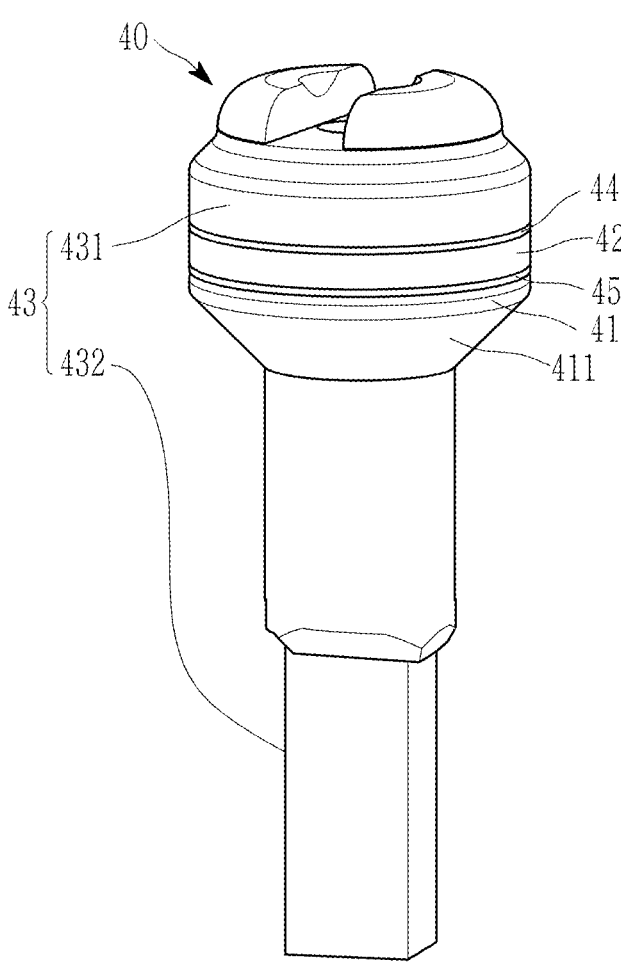
FIG. 3 is a perspective view illustrating a state in which the nipple assembly for a spoke wheel applied to FIG. 1 is completely coupled.
Figure 4:
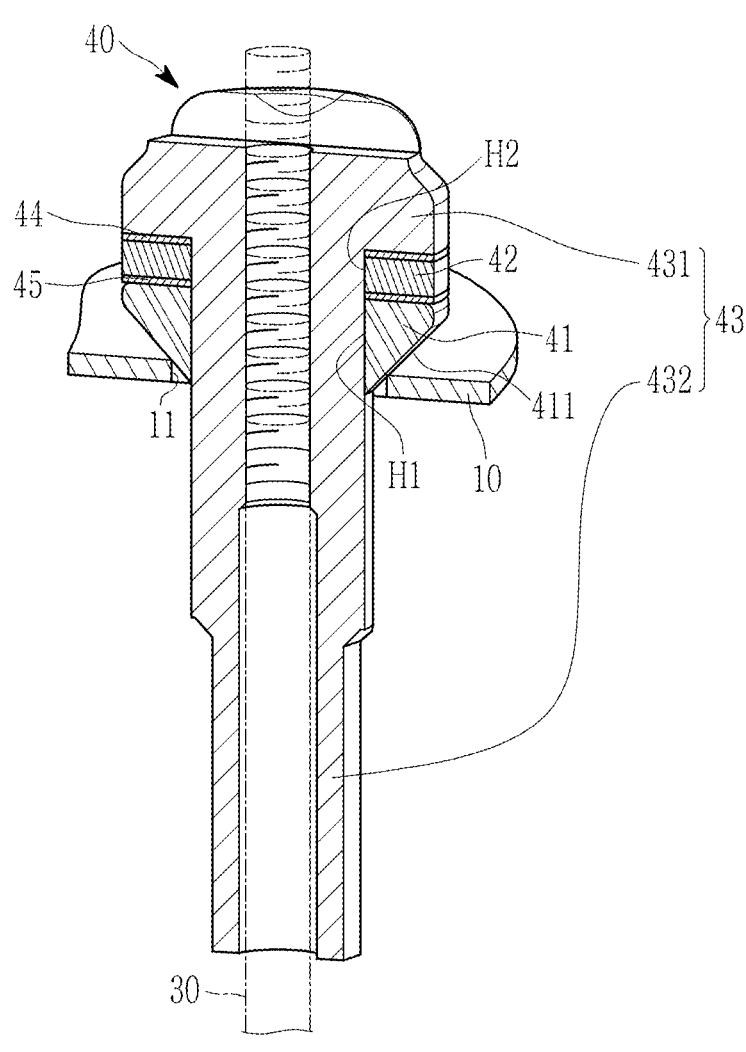
FIG. 4 is a longitudinal sectional view of FIG. 3.

FIG. 2 is a perspective view illustrating a state in which the nipple assembly for a spoke wheel applied to FIG. 1 is loosely coupled, FIG. 3 is a perspective view illustrating a state in which the nipple assembly for a spoke wheel applied to FIG. 1 is completely coupled, and FIG. 4 is a longitudinal sectional view of FIG. 3. With reference to FIGS. 2 to 4, the nipple assembly 40 includes a nipple base 41, a vibration attenuation member 42, and a main body 43.

The nipple base 41 is disposed outside the spoke hole 11 provided in the rim 10, i.e., disposed radially outside the rim 10 and having a tapered surface 411 seated in the spoke hole 11. The nipple base 41 has a first through-hole H1 provided at an axial center of the nipple assembly 40.

That is, the tapered surface 411 of the nipple base 41 is coupled to the spoke hole 11, and the nipple base 41 copes with a change in direction of the spoke 30, such that a coupled state of the nipple base 41 in the spoke hole 11 may be stably changed. In addition, the tapered surface 411 defines a truncated cone having a straight line in a cross-sectional view taken in the axial direction. The tapered surface 411 may define a convex or concave curved line in a cross-sectional view.

The vibration attenuation member 42 corresponds to the first through-hole H1 and has a second through-hole H2 provided at the axial center of the nipple assembly 40. The vibration attenuation member 42 is provided outside the nipple base 41, i.e., provided radially outside the rim 10. The vibration attenuation member 42 may be interposed between the nipple base 41 and the main body 43 in the axial direction of the nipple assembly 40, i.e., a length direction of the spoke 30 and configured to attenuate vibration in the length direction.

The main body 43 includes a column portion 432 and a nipple head 431 so that the other end of the spoke 30 having one end installed on the hub is installed on the rim 10. The column portion 432 has a smaller diameter than the nipple head 431 and is elongated toward one side from the nipple head 431. The column portion 432 penetrates the spoke hole 11 by being inserted into the second through-hole H2 and the first through-hole H1 from the outside of the vibration attenuation member 42, i.e., from the radial outside of the rim 10. The column portion 432 is coupled to the first and second through-holes H1 and H2 with tolerance.

The nipple head 431 is positioned outside the vibration attenuation member 42. The column portion 432 and the nipple head 431 respectively have a through port and a screw hole formed in inner surfaces thereof, such that the spoke 30 is inserted into the through port from the other outside of the spoke hole 11, i.e., from the other side in the radial direction, and a screw thread formed at an end of the spoke 30 is screw-coupled to the screw hole.

As illustrated, the tapered surface 411 of the nipple base 41 may be formed to be tapered in an extension direction of the column portion 432. Therefore, the nipple base 41 is seated while being supported on an edge of the spoke hole 11 of the rim 10.

The nipple head 431 of the main body 43 is positioned at one side based on a penetration direction of the spoke hole 11 provided in the rim 10. The column portion 432 extends toward the other side from the nipple head 431, penetrates the spoke hole 11, and is screw-coupled to the spoke 30. The nipple base 41 is fitted with the column portion 432 through the first through-hole H1, disposed at one side based on the penetration direction of the spoke hole 11, and supported on the rim 10. The vibration attenuation member 42 is positioned between the nipple head 431 and the nipple base 41 by being fitted with the column portion 432 through the second through-hole H2 and attenuates vibration.

The tolerance may be set between the column portion 432 of the main body 43 and the second through-hole H2 of the vibration attenuation member 42 and set between the column portion 432 of the main body 43 and the first through-hole H1 of the nipple base 41, thereby enabling the vibration attenuation member 42 to attenuate vibration.

A diameter of the vibration attenuation member 42 is equal to a maximum diameter of the nipple head 431 or a maximum diameter of the nipple base 41. Therefore, the vibration attenuation member 42 may be disposed between the nipple head 431 and the nipple base 41 and sufficiently attenuate vibration.

For example, the nipple base 41 is seated in the spoke hole 11 of the rim 10, and the main body 43 is coupled to the spoke 30, such that the nipple base 41 and the main body 43, which are made of metal, may correspond to compressive strength, and the vibration attenuation member 42, which is made of polymer, may correspond to impact resistance and flame resistance.

More specifically, the nipple base 41 and the main body 43 may be made of at least one selected from a group consisting of steel, stainless steel, aluminum, brass, titanium, and alloys thereof. For example, the vibration attenuation member 42 may be made of polyetheretherketone (PEEK) or polyamide-imide (PAI).

The vibration attenuation member 42 has necessary high compressive strength, impact resistance, and flame resistance. The compressive strength (compressive strength at yield) means compressive strength at which plastic deformation begins. The nipple assembly 40 for fixing the spoke 30 needs to be maintained in a stable shape even in a situation in which the spoke 30 of the wheel is damaged by an impact load while the bicycle travels.

For example, a butted spoke used for a high-performance bicycle wheel has fracture strength of at most 300 to 350 kgf for each spoke. Therefore, the vibration attenuation member 42 applied to the nipple assembly 40 is required not to cause plastic deformation even with a compressive load of at most 350 kgf.

For example, the rim used for a general bicycle wheel has the spoke hole 11 having a diameter of about 7.6 to 8.0 mm so that the nipple is inserted into the spoke hole 11. A maximum diameter of the nipple assembly 40, i.e., a maximum diameter of the column portion 432 may be limited to 7.4 mm ($\frac{1}{2}=r_{out}=3.7$) in order to ensure temporary assemblability. Because a diameter of a central axis of the column portion 432 is 4.0 mm ($\frac{1}{2}=r_{in}=2.0$), a maximum contact area A of the vibration attenuation member 42 is defined by Equation 1.

$$A = \pi(r_{out}^2 - r_{in}^2)$$

$$A = \pi(3.7^2 - 2.0^2) = 30.44 \text{ mm}^2 \qquad \text{[Equation 1]}$$

The minimum compressive strength required for the vibration attenuation member 42 is defined by Equation 2.

$$\sigma_y = \frac{F_{max}}{A} \qquad \text{[Equation 2]}$$

$$\sigma_y = \frac{3500 \text{ N}}{30.44 \text{ mm}^2} = 114.98 \text{ N/mm}^2 = 114.98 \text{ } MPa$$

The compressive strength of polymer has a value about 20% higher than a value of tensile strength. Examples of high-performance polymer having compressive strength of 114.98 MPa or tensile strength of 95.8 MPa includes ULTEM, PEEK, PAI, and the like.

Because an impact load is generated periodically in the nipple assembly 40 used for the spoke wheel 100 of the rotating bicycle, the vibration attenuation member 42 is required to have high compressive strength and high impact resistance. In consideration of a Charpy impact test as a criterion for determining high impact resistance, a shape of the vibration attenuation member 42 has no notch. Therefore, the polymer, which is not damaged in an unnotched Charpy impact test, is PEEK and PAI.

PEEK and PAI have similar mechanical properties. However, PAI has better mechanical stiffness at a high temperature, whereas PEEK has an elongation rate at break of 40% that is much higher than PAI having an elongation rate of 12%, such that damage does not easily occur even at a high load by which plastic deformation occurs.

As a result, PEEK and PAI may be selected as a material most suitable for the vibration attenuation member 42 of the nipple assembly 40 that requires high compressive strength and high impact resistance. Among the polymers, PEEK has a very high elongation rate and thus is hardly fractured by a typical impact load. Therefore, PEEK may be selected as an optimal material, instead of PAI, in order to maximize traveling safety of the spoke wheel 100 of the bicycle.

Meanwhile, the nipple assembly 40 may further include thin adhesive films 44 and 45 or a bonding agent (not illustrated). The adhesive films 44 and 45 or the bonding agent may be provided between the nipple base 41 and one surface of the vibration attenuation member 42 and between the main body 43 and the other surface of the vibration attenuation member 42 and attach the nipple base 41 and the vibration attenuation member 42 and attach the main body 43 and the vibration attenuation member 42.

The adhesive films 44 and 45 or the bonding agent may be configured as thin adhesive films or a bonding material that may ignore the compressive deformation amount of the nipple base 41, the vibration attenuation member 42, and the main body 43. The nipple assembly 40 may have appropriate tolerance between the nipple base 41 and the vibration attenuation member 42 so that the nipple assembly 40 may finely move upward or downward based on the axial center.

In addition, the nipple assembly 40 serves as an isolator that effectively attenuates fine vibration generated between the rim 10 and the spoke 30. Therefore, it is possible to significantly improve comfort by attenuating fine vibration without decreasing the reactivity (stiffness) of the spoke wheel only by simply replacing a nipple for a spoke wheel in the related art with the nipple assembly 40 of the present embodiment.

Hereinafter, another embodiment of the present disclosure will be described. The description of the same configuration will be omitted, and different configurations will be compared and described.

Figure 5:
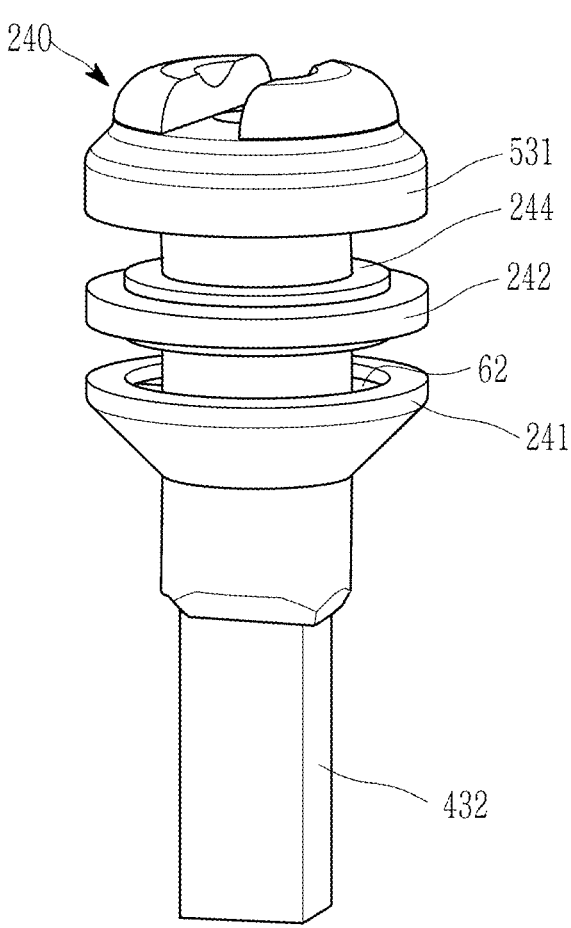
FIG. 5 is a perspective view illustrating a state in which a nipple assembly for a spoke wheel according to a second embodiment of the present disclosure is loosely coupled.
Figure 6:
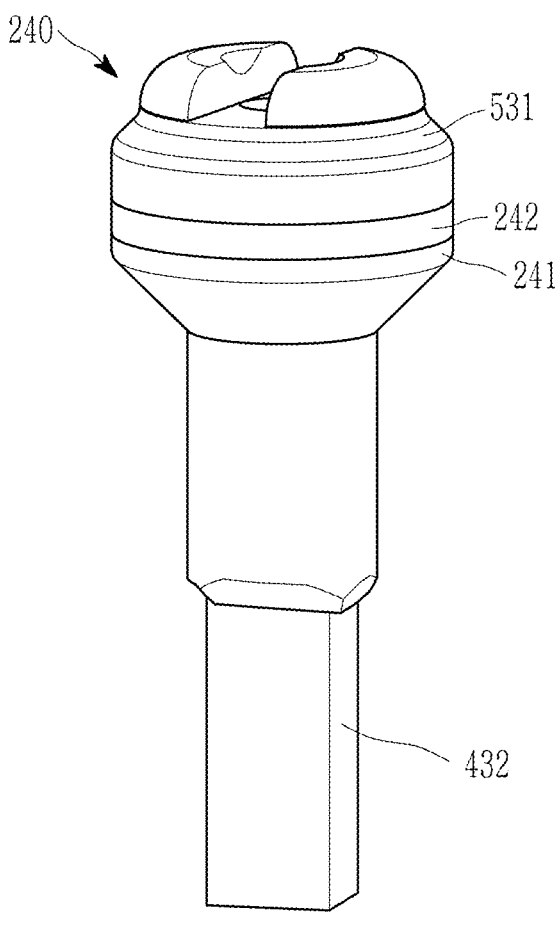
FIG. 6 is a perspective view illustrating a state in which the nipple assembly for a spoke wheel applied to FIG. 5 is completely coupled.
Figure 7:
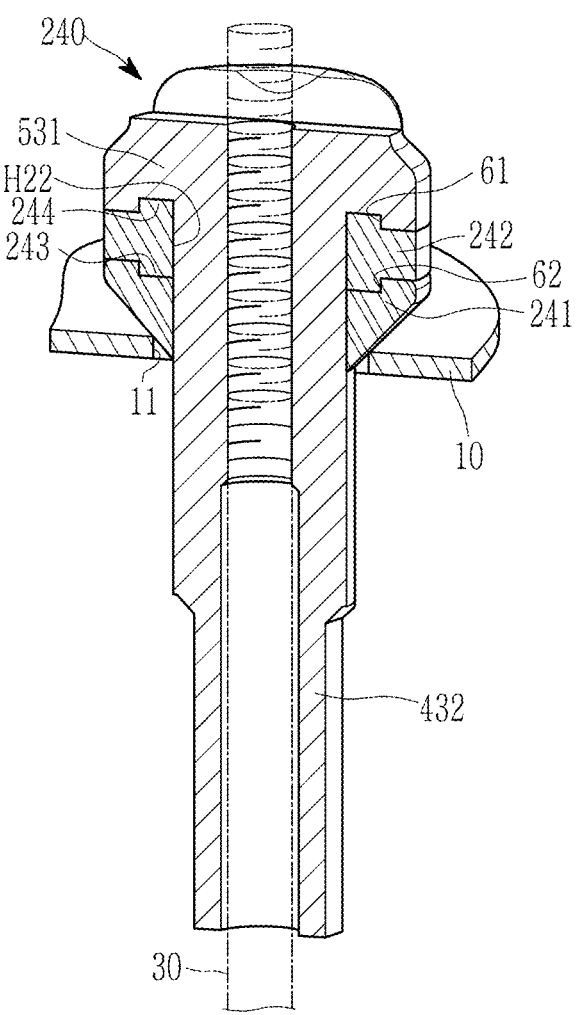
FIG. 7 is a longitudinal sectional view of FIG. 6.

FIG. 5 is a perspective view illustrating a state in which a nipple assembly for a spoke wheel according to a second embodiment of the present disclosure is loosely coupled, FIG. 6 is a perspective view illustrating a state in which the nipple assembly for a spoke wheel applied to FIG. 5 is completely coupled, and FIG. 7 is a longitudinal sectional view of FIG. 6.

With reference to FIGS. 5 to 7, in a nipple assembly 240, a vibration attenuation member 242 has protruding portions 243 and 244 disposed around the second through-hole H22 and extending and protruding toward one axial side (not illustrated) or two opposite sides. A nipple base 241 and a nipple head 531 respectively have grooves 61 and 62 disposed around the column portion 432 and coupled to the protruding portions 243 and 244. Although not illustrated, the groove may correspond to the protruding portion formed at one side and be provided at one of the nipple base and the nipple head.

The protruding portions 243 and 244 are fastened to the grooves 61 and 62 by interference fit. Therefore, the nipple base 241, the vibration attenuation member 242, and the nipple head 531 constitute a single assembly and attenuate fine axial vibration of the nipple assembly 240. In addition, the protruding portions 243 and 244 and the grooves 61 and 62 may further attenuate fine vibration applied to the nipple assembly 240 in a direction other than the axial direction.

Figure 8:
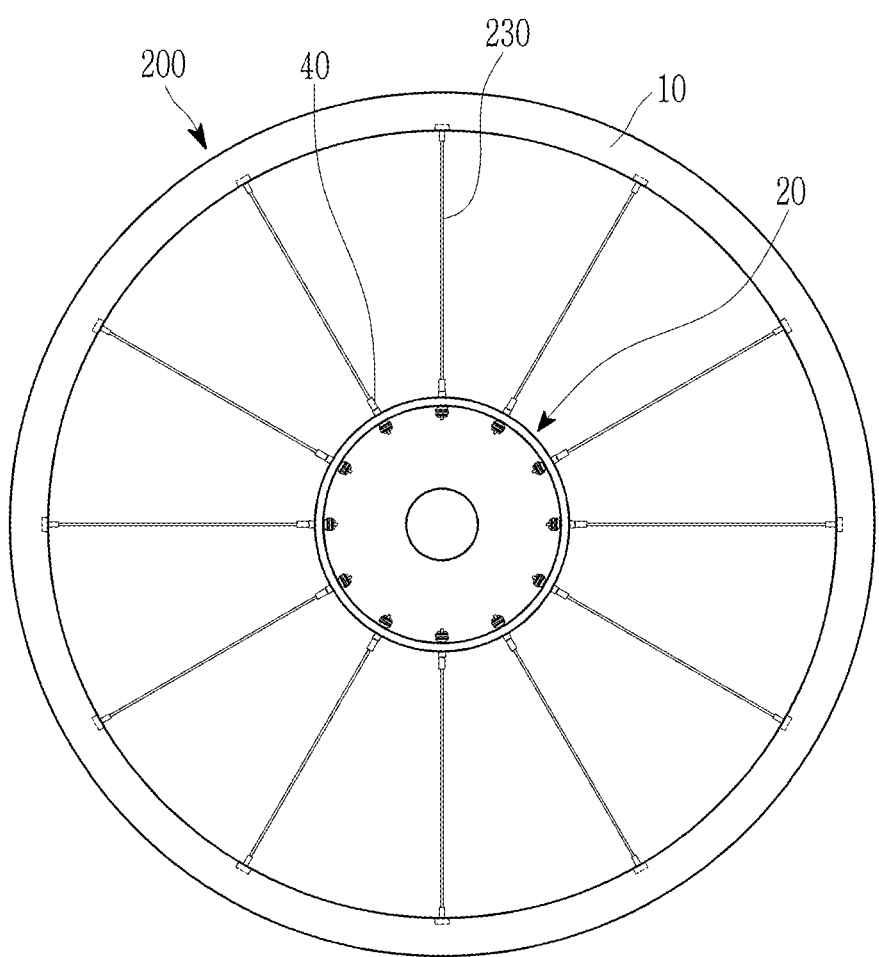
FIG. 8 is a front view illustrating another spoke wheel include the nipple assembly for a spoke wheel according to the embodiments of the present disclosure.
Figure 9:
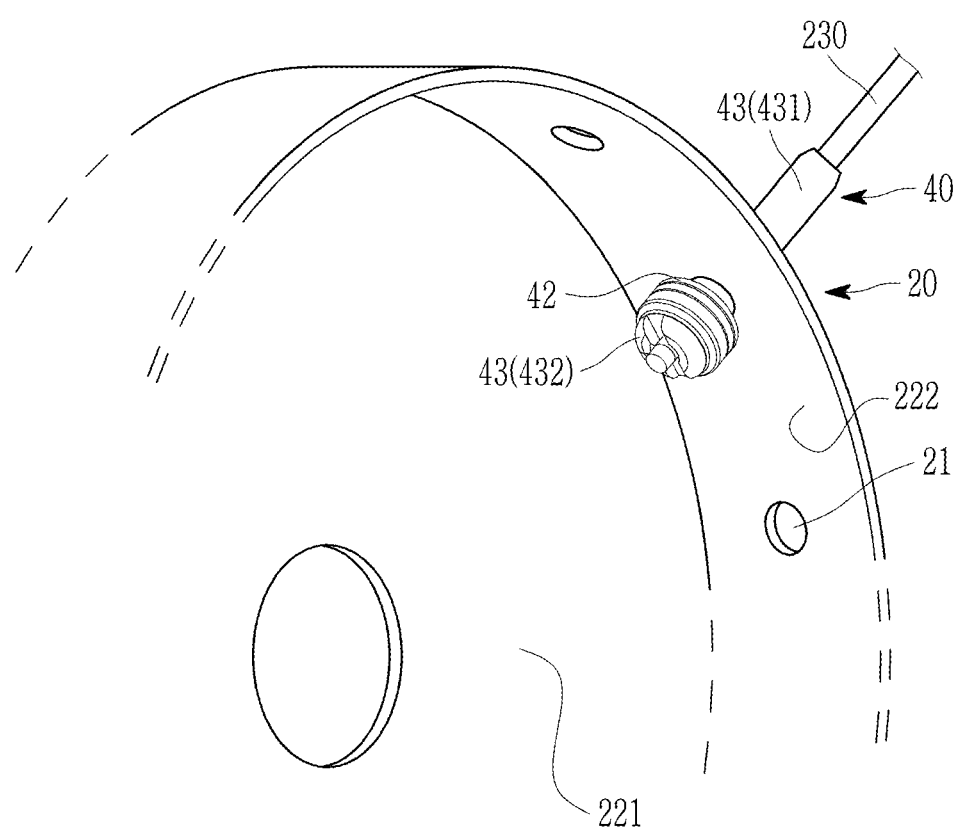
FIG. 9 is a partial perspective view illustrating a state in which the nipple assembly applied to FIG. 8 and a hub are coupled.

FIG. 8 is a front view illustrating another spoke wheel that includes the nipple assembly for a spoke wheel according to the embodiments of the present disclosure, and FIG. 9 is a partial perspective view illustrating a state in which the nipple assembly applied to FIG. 8 and a hub are coupled. For convenience of illustration, the nipple assembly 40 of the first embodiment will be illustrated and described as an example, but the nipple assembly 240 of the second embodiment may also be equally applied.

With reference to FIGS. 8 and 9, in a spoke wheel 200 of the present embodiment, the nipple assembly 40 may be coupled and installed in the spoke hole 21 provided in the hub 20, and the nipple assembly 40 may be screw-coupled to a spoke 230. In the spoke wheel 200, the hub 20 has the plurality of spoke holes 21, and the nipple assembly 40 is coupled and installed in each of the spoke holes 21. To this end, for example, the hub 20 includes a plate portion 221 on which a shaft (not illustrated) is mounted, and a flange portion 222 protruding from an outer periphery of the plate portion 221 in the axial direction of the hub 20. The plurality of spoke holes 21 is provided in the flange portion 222.

That is, the nipple assembly 40 is disposed to penetrate the spoke hole 21 from the radial inside to the radial outside of the rim 10 and the hub 20 and screw-coupled to one end of the spoke 230 provided from the radial outside to the radial inside. The other end of the spoke 230 is coupled to the spoke hole 11 provided in the rim 10. That is, the nipple assembly 40 is installed on the spoke wheel 200 in FIGS. 8 and 9 in a direction opposite to the direction in which the spoke wheel 100 in FIGS. 1 and 4 is installed.

Therefore, the nipple base 41 is provided inside the flange portion 222 and disposed in the spoke hole 21, the vibration attenuation member 42 is disposed inside the nipple base 41, the main body 43 is disposed to penetrate the vibration attenuation member 42 and the nipple base 41 and penetrate the spoke hole 21 from the inside to the outside, and a screw thread formed at an end of the spoke 230 is screw-coupled to the screw hole.

As illustrated, the tapered surface 411 of the nipple base 41 may be formed to be tapered in the extension direction of the column portion 432. Therefore, the nipple base 41 is seated while being supported on an edge of the spoke hole 21 of the hub 20.

The other end of the spoke 230 is coupled to the spoke hole 11 provided in the rim 10 (see FIG. 8). Therefore, the spoke 230 receives compressive strength, an impact load, and a tensile force between the hub 20 and the rim 10. That is, high compressive strength, impact resistance, and flame resistance are required for the spoke 230 and the nipple assembly 40.

In addition, the nipple assemblies may be provided at two opposite ends of the spoke and provided between one end of the spoke and the rim and between the other end of the spoke and the hub. In this case, because the two nipple assemblies are provided on the single spoke, the effect of attenuating fine vibration may be further improved.

While the exemplary embodiments of the present disclosure have been described above, the present disclosure is not limited thereto, and various modifications can be made and carried out within the scope of the claims, the detailed description of the present disclosure, and the accompanying drawings, and also fall within the scope of the present disclosure.

DESCRIPTION OF REFERENCE NUMERALS

| | |
|---|---|
| 10: Rim | 11, 21: Spoke hole |
| 20: Hub | 30, 230: Spoke |
| 40, 240: Nipple assembly | 41: Nipple base |
| 42, 242: Vibration attenuation member | 43: Main body |
| 44, 45: Adhesive film | 61, 62: Groove |
| 100, 200: Spoke wheel | 221: Plate portion |
| 222: Flange portion | 243, 244: Protruding portion |
| 411: Convex surface | 431: Nipple head |
| 432: Column portion | H1: First through-hole |
| H2, H22: Second through-hole | |

The invention claimed is:

1. A nipple assembly for a spoke wheel, which is coupled to at least one end of a spoke provided on a spoke wheel, the nipple assembly comprising:
a main body including a nipple head, and a column portion having a smaller diameter than the nipple head and elongated from the nipple head toward one side;
a nipple base having a first through-hole and fitted with the column portion through the first through-hole; and
a vibration attenuation member having a second through-hole and positioned between the nipple head and the nipple base by being fitted with the column portion through the second through-hole,
wherein the vibration attenuation member is interposed between the nipple head and the nipple base in an axial direction of the nipple assembly such that opposing surfaces of the vibration attenuation member respectively face the nipple head and the nipple base on planes perpendicular to the axial direction, and is configured to attenuate vibration in a length direction of the spoke through elastic compressive deformation.

2. The nipple assembly of claim 1, wherein:
the nipple base has a tapered surface formed to be tapered in an extension direction of the column portion.

3. The nipple assembly of claim 1, wherein:
a diameter of the vibration attenuation member is equal to a maximum diameter of the nipple head or a maximum diameter of the nipple base.

4. The nipple assembly of claim 1, wherein:
the nipple base and the main body are made of metal, and the vibration attenuation member is made of polymer.

5. The nipple assembly of claim 1, wherein:
the nipple base and the main body are made of at least one selected from a group consisting of steel, stainless steel, aluminum, brass, titanium, and alloys thereof, and
the vibration attenuation member is made of polyetheretherketone (PEEK) or polyamide-imide (PAI).

6. The nipple assembly of claim 1, further comprising:
a thin adhesive film or bonding agent provided between the nipple base and one surface of the vibration attenuation member and between the main body and the other surface of the vibration attenuation member and configured to attach the nipple base and the vibration attenuation member and attach the main body and the vibration attenuation member.

7. The nipple assembly of claim 1, wherein:
tolerance is set between the column portion of the main body and the second through-hole of the vibration attenuation member and between the column portion of the main body and the first through-hole of the nipple base.

8. The nipple assembly of claim 1, wherein:
the vibration attenuation member has a protruding portion provided around the second through-hole and extending and protruding toward one side at least in an axial direction, and
at least one of the nipple base and the nipple head has a groove provided around the column portion and coupled to the protruding portion.

9. A spoke wheel, in which a rim and a hub are connected by a plurality of spokes, the spoke wheel comprising:
a nipple assembly coupled to at least one end of the spoke, wherein the nipple assembly comprises:
a main body including a nipple head positioned at one side based on a penetration direction of a spoke hole provided in the rim or the hub, and a column portion extending from the nipple head toward the other side and screw-coupled to the spoke while penetrating the spoke hole;
a nipple base having a first through-hole, fitted with the column portion through the first through-hole, disposed at one side based on the penetration direction of the spoke hole, and supported on the rim or the hub; and
a vibration attenuation member having a second through-hole and positioned between the nipple head and the nipple base by being fitted with the column portion through the second through-hole,
wherein the vibration attenuation member is interposed between the nipple head and the nipple base in an axial direction of the nipple assembly such that opposing surfaces of the vibration attenuation member respectively face the nipple head and the nipple base on planes perpendicular to the axial direction, and is configured to attenuate vibration in a length direction of the spoke through elastic compressive deformation.

10. The spoke wheel of claim 9, wherein:
the nipple base has a tapered surface formed to be tapered in an extension direction of the column portion.

11. The spoke wheel of claim 10, wherein:
the spoke hole is provided in the rim, and
the nipple base is supported and seated on an edge of the spoke hole of the rim.

12. The spoke wheel of claim 10, wherein:
the spoke hole is provided in the hub, and
the nipple base is supported and seated on an edge of the spoke hole of the hub.

13. The spoke wheel of claim 9, wherein:
the nipple base and the main body are made of metal, and the vibration attenuation member is made of polymer.

14. The spoke wheel of claim 9, wherein:
the nipple base and the main body are made of at least one selected from a group consisting of steel, stainless steel, aluminum, brass, titanium, and alloys thereof, and
the vibration attenuation member is made of polyetheretherketone (PEEK) or polyamide-imide (PAI).

15. The spoke wheel of claim 9, wherein:
tolerance is set between the column portion of the main body and the second through-hole of the vibration attenuation member and between the column portion of the main body and the first through-hole of the nipple base.

* * * * *